A. S. HUBBARD.
ELECTRICAL SYSTEM OF DISTRIBUTION.
APPLICATION FILED JAN. 29, 1908.
899,535.
Patented Sept. 29, 1908.
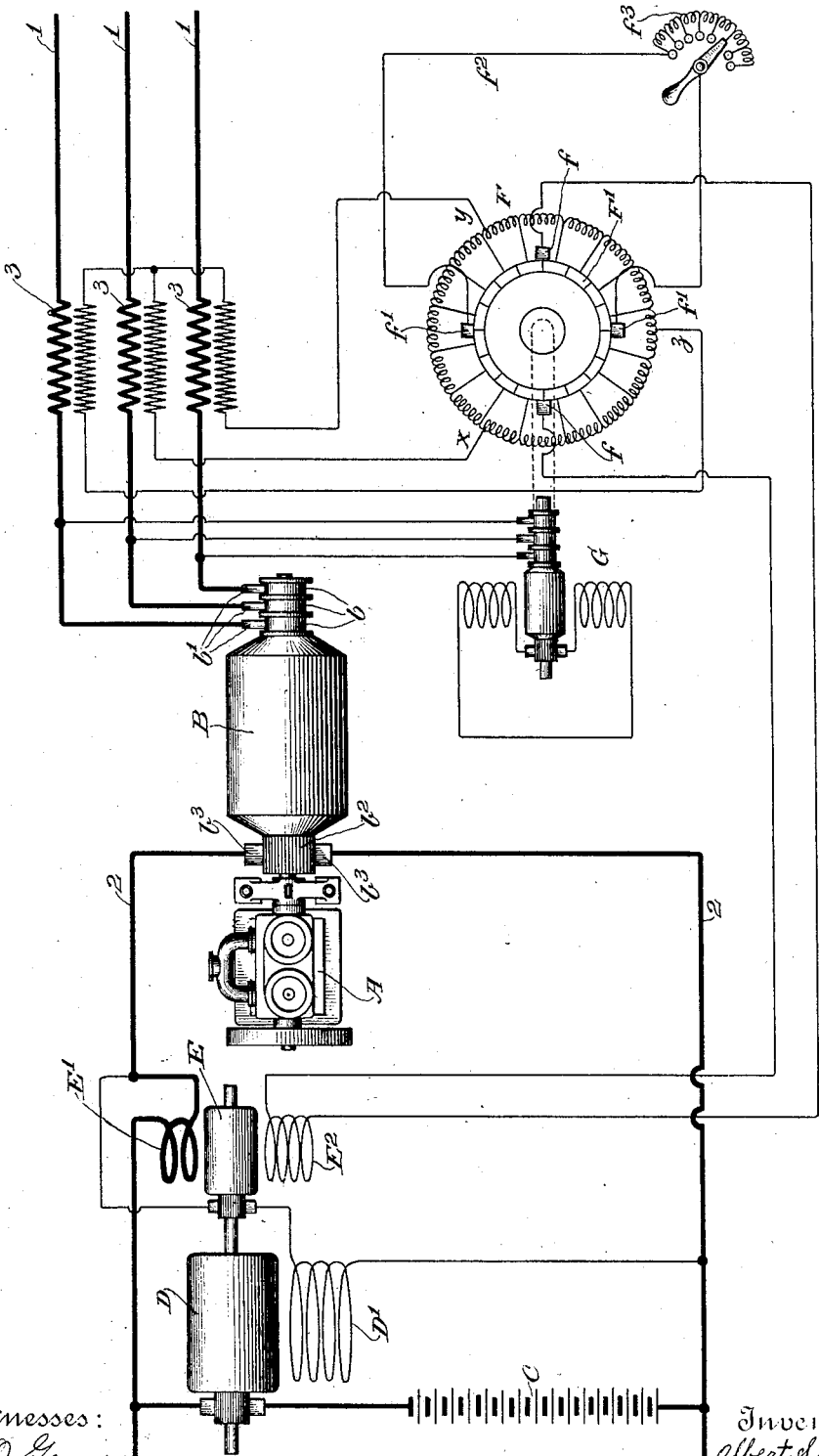

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

ELECTRICAL SYSTEM OF DISTRIBUTION.

No. 899,535.     Specification of Letters Patent.     Patented Sept. 29, 1908.

Application filed January 29, 1908. Serial No. 413,211.

*To all whom it may concern:*

Be it known that I, ALBERT S. HUBBARD, a citizen of the United States, and a resident of Belleville, county of Essex, State of New Jersey, have invented certain new and useful Improvements in Electrical Systems of Distribution, of which the following is a specification.

My invention relates to an improvement in electrical systems of distribution which supply a compensatory storage apparatus.

In accordance with my invention I supply currents of different characters from generating apparatus driven from the same prime mover, such apparatus preferably being a dynamo arranged to give out different characters of current, as for example alternating and direct currents, and I regulate a battery which is connected to and supplies only one of the circuits so as to maintain the total currents or loads of the two circuits substantially constant, by varying the battery action to vary the current output of one circuit according as the total load on both circuits varies.

The specific combination which I have invented comprises a dynamo having a commutator whose brushes form the terminals of a D. C. circuit and slip rings which supply an A. C. circuit. Across the D. C. circuit is a branch containing a battery and booster, the booster being regulated in any suitable way responsive to current or load fluctuations on the two generator circuits.

In such a system a single booster only is necessary whatever the characteristics of the two sides of the system, and it is unnecessary to provide load carrying rectifying devices between the A. C. and D. C. sides of the system or to place the battery in direct operative relation with the A. C. circuit.

These and more specific features of my invention will be more fully explained in the detailed description which follows.

The drawing accompanying this specification is a diagram which illustrates a system embracing a specific embodiment of my invention.

In the drawing A represents a prime mover which may be in the form of a steam engine or any other suitable form. Directly connected to this and operated thereby is an alternating-direct current generator B furnishing an alternating current at one end through the slip rings $b$ and brushes $b'$, to the alternating current mains 1. At the other end of the generator B is a commutator $b^2$ from which a direct current is taken by means of the brushes $b^3$ and furnished to the direct current mains 2. Connected across the direct current mains 2 is a battery C and in series therewith the armature D of a booster which may be driven in any well known manner, as by a motor or otherwise. This booster is provided with a field $D'$ connected across the direct current mains and having in series therewith the armature of a counter-electromotive-force generator, E. This counter-electromotive-force generator is provided with two field windings, one of which, $E'$, is connected in series in on of the direct current mains, 2, and is therefore responsive to current changes in the direct current circuit. The other field winding $E^2$ is connected through a rectifying device to the alternating current mains as hereinafter more fully described. These two coils $E'$ and $E^2$ act cumulatively.

At 3 I have shown transformers whose primaries are connected in series in the alternating current mains and whose secondaries are connected to distributed windings on the rectifier, which is of the induction type and which is diagrammatically indicated at F. Some outside means must be provided to drive the rectifier synchronously. In the present instance this is accomplished by the synchronous motor G driven from the alternating current circuit. This motor drives the rectifier so that it rotates synchronously with the voltage of the alternating current circuit. The regulating field coil $E^2$ is connected to brushes $f$ bearing on the commutator $F'$ of the rectifier. These brushes are preferably placed in the usual position, namely, at the points of normal maximum voltage. This rectifier placed in the regulating circuit and employed to provide a current to the regulating coil $E^2$ is more fully described together with its incumbent advantages in my Patent No. 869,244, dated Oct. 29, 1907. If then the power factor is unity a current will be produced in the coil $E^2$ proportional to and varying with the current in the alternating current mains. If the power factor of the alternating side of the system changes the brushes $f$ will no longer be at the points of maximum difference of potential but these points will be shifted to one side of said brushes. The brushes, $f$, will then have a smaller difference of potential between them and the current furnished the coil $E^2$ will be decreased in the same proportion as the energy current (as distinguished from wattless current) of the alternating current mains is decreased. The extra current furnished to the rectifier and proportional to the wattless current is taken off by the brushes $f'$ and allowed to dissipate in the by-pass circuit $f^2$ and adjustable resistance $f^3$, these brushes $f'$ now having some difference of potential between them due to the change in power factor and shifting of the points of maximum difference of potential. It will therefore be seen that the current in coil $E^2$ varies in accordance with changes of the current in transformers 3 only when there is no change of power factor. If, however, there is a coincident change of current and change of power factor the current in the coil $E^2$ will be a resultant of these changes, an increase of current in the alternating current circuit tending to increase the current in coil $E^2$ while a decrease of power factor tends to decrease it. In this way the regulation is not affected by the wattless current component of the apparent energy.

When both the alternating and direct current circuits are operating under normal load the coils $E'$ and $E^2$ furnish a field for the generator $E$ of such a strength that it will produce a voltage just equal and opposed to the voltage of the direct current mains. No current will therefore flow through the coil $D'$ and the booster will "float" across the line. If the load on either side of the system increases or decreases the field $E'$ or $E^2$ is correspondingly increased or decreased and the booster is operated in the usual well-known manner, to either add voltage to the battery so that it will take the additional load, or to oppose the battery voltage so that the battery will be charged from the mains. It will also be noticed that if the load on one side of the system increases by a certain amount and the load on the other side of the system decreases by the same amount the total field strength of the generator $E$ will remain practically unchanged; and in any case the total field strength of the generator $E$ varies as the sum of the loads on the two sides of the system. Thus when the load on the generator B or prime mover A is increased the booster is operated to add voltage to the battery so that it may take the additional load and when the load on the generator or prime mover decreases the booster is operated to oppose the battery so that it will be charged from the direct current mains and tend to bring the load on the generator or prime mover, A, up to normal. This regulating action takes place irrespective of whether the change of load takes place on one side of the system or the other, or on both sides of the system simultaneously.

Each load circuit takes its current directly from the generator or generating means and no rectifier or converter is necessary between the two sides of the system, which carries load currents. Therefore the losses occurring in such a rectifier are wholly eliminated. The generating means for both sides of the system may consist simply of a single generator having both direct and alternating current terminals. By the use of this structure the iron losses due to two or more separate generators are materially decreased, although my invention in its broadest aspects is not limited to the use of a single generator.

It is obvious that the principles of my invention as herein described may be applied to many different specific systems either where voltage or where current regulation is the dominating regulation. I do not, therefore, limit myself to the specific features shown and described but

What I claim as new and desire to protect by Letters Patent is:

1. The combination of a generator, two independent circuits supplied thereby, a battery connected to one only of said circuits, a booster in series with the battery and adapted to control the charge and discharge thereof, and means for regulating the booster responsively to current changes in both of said circuits.

2. The combination of a generator, two independent circuits supplied thereby, a battery connected to one only of said circuits, a booster in series with the battery and adapted to control the charge and discharge thereof, a coil in each of said circuits and regulating apparatus for said booster affected by the current in each of said coils.

3. The combination of a generator, two independent circuits supplied thereby, a battery connected to one only of said circuits, a booster in series with the battery and adapted to control the charge and discharge thereof, and means for governing said booster for maintaining an approximately constant load on the generator.

4. The combination of a generator, two independent circuits supplied thereby, a battery connected to one only of said circuits, a booster in series with the battery and adapted to control the charge and discharge thereof, a generator in series with the field of the booster, and means for varying the field strength of said generator in accordance with variations of the total load of the two independent circuits.

5. The combination of an alternating-direct current generator, alternating and direct current circuits therefor, a battery and a booster connected to the direct current circuit, a generator in series with the booster field part of the field of said generator being responsive to changes in the direct current and part responsive to changes in the load on the alternating current circuit.

6. The combination of a double current generator, two independent circuits therefor, a battery and a booster connected to one circuit, and a source of electromotive force in series with the field of the booster and responsive to current changes in one circuit and to power changes in the other circuit.

7. In a system of electrical distribution, a prime mover, a direct current generating means and an alternating current generating means directly operated thereby, a direct and an alternating current circuit respectively for said generating means, a booster and battery in the direct current circuit and means for governing said booster subject to load fluctuations in both of said circuits.

8. In a system of electrical distribution, a prime mover, a direct and an alternating current generating means mechanically operated thereby, a battery and booster connected to the direct current generating means, a generator in series with the field of the booster, part of the field of said generator being responsive to changes in the current of the direct current generating means and part being responsive to changes in the power developed by the alternating current generating means, regardless of the size of the power factor.

9. The combination of a generator, two independent circuits supplied thereby, a storage apparatus connected to one of said circuits, a booster in series with the storage apparatus and means for regulating the booster responsive to changes in the electrical condition of both of said circuits.

10. The combination of a generator, two independent circuits supplied thereby, one of said circuits being an A. C. circuit, a storage apparatus and a booster connected to the other circuit, a generator for governing said booster, said generator being responsive to load changes in both circuits regardless of power factor changes.

In testimony whereof, I have signed my name to this specification, in the presence of two subscribing witnesses.

ALBERT S. HUBBARD.

Witnesses:
GORHAM CROSBY,
EDWIN SEGER.